US006933438B1

(12) United States Patent
Watts et al.

(10) Patent No.: US 6,933,438 B1
(45) Date of Patent: Aug. 23, 2005

(54) DUCT WITH WIRE LOCATOR

(75) Inventors: Eric M. Watts, Erie, PA (US); Robert C. Humphreys, Conneaut, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 10/679,047

(22) Filed: Oct. 3, 2003

Related U.S. Application Data

(60) Provisional application No. 60/416,352, filed on Oct. 4, 2002.

(51) Int. Cl.[7] .............................................. H02G 3/04
(52) U.S. Cl. ........................ 174/48; 174/68.1; 174/98; 174/72 R; 138/104; 324/326
(58) Field of Search .......................... 174/48, 37, 65 R, 174/135, 68.3, 95, 97, 98, 72 R, 112, 96, 174/21 R, 21 C, 101; 248/68.1; 138/125, 138/132, 140, 104, 110; 52/287.1; 29/860; 324/326, 66, 67

(56) References Cited

U.S. PATENT DOCUMENTS

| 3,367,370 A | * | 2/1968 | Sherlock ..................... 174/68.3 |
| 3,555,170 A | * | 1/1971 | Petzetakis ..................... 174/47 |
| 3,580,983 A | * | 5/1971 | Jackson ........................ 174/47 |
| 4,781,958 A | * | 11/1988 | Gilbert ......................... 428/76 |
| 4,988,236 A | * | 1/1991 | Ramsey et al. ............. 428/907 |
| 5,036,210 A | * | 7/1991 | Goodman .................... 264/105 |
| 5,045,368 A | * | 9/1991 | Cosman et al. ............ 428/34.1 |
| 5,212,349 A |   | 5/1993 | Pelzer |
| 5,415,242 A | * | 5/1995 | Pelzer ....................... 174/21 R |
| 5,532,598 A | * | 7/1996 | Clark et al. ................. 324/326 |
| 5,719,353 A |   | 2/1998 | Carlson et al. |
| 6,092,558 A | * | 7/2000 | Maccario .................... 138/178 |
| 6,135,159 A | * | 10/2000 | Karl ............................ 138/143 |
| 6,609,855 B1 | * | 8/2003 | Eslambolchi et al. ....... 138/104 |
| 2003/0094298 A1 |   | 5/2003 | Morrow et al. |

FOREIGN PATENT DOCUMENTS

| EP | 0159307 | 10/1985 | |
| GB | 2197419 A | * 5/1998 | ........... F16L 55/00 |

OTHER PUBLICATIONS

American Heritage Dictionary of English Language, 1992, Third edition.*
"Coextrusion" Copyright (1995-2004). The Dow Chemical Company. www.dow.com/polyolefins.*
"Properties of LDPE an HDPE", Roger D. Corneliussen. Copyright 2002.*
"Techplas Materials", http://ft.techplas.f9.co.uk/material. htm.*

* cited by examiner

Primary Examiner—Dean A. Reichard
Assistant Examiner—Angel R. Estrada
(74) Attorney, Agent, or Firm—Jones Day

(57) ABSTRACT

A cylindrical duct of plastic material is coextruded with a longitudinal wire located between the duct inner and outer surfaces, and with a stripe of a different color plastic material than the duct overlying the wire. The stripe is of a softer plastic material than the duct plastic material to facilitate cutting of same to expose the wire, but is compatible with the duct plastic material so as to crosslink therewith.

3 Claims, 2 Drawing Sheets

DUCT WITH WIRE LOCATOR

RELATED APPLICATIONS

This application claims subject matter disclosed in U.S. provisional application Ser. No. 60/416,352 filed Oct. 4, 2002, the benefit of the filing date of which is hereby claimed.

BACKGROUND OF THE INVENTION

This application relates to the art of plastic duct and, more particularly, to such duct having a longitudinally extending wire embedded in the wall thereof. The invention is particularly applicable to toneable duct and will be described with specific reference thereto. However, it will be appreciated that the invention has broader aspects and is applicable to other types of duct having items embedded in the wall thereof.

Toneable duct is plastic duct that has an electrically conductive longitudinally extending wire embedded in the wall thereof. A long string of buried pipe can be located by passing a signal through the wire and using instruments at the surface to locate the pipe by detecting the signal.

The wire is very small and difficult to locate by looking for the exposed wire end at an end of a duct. The wire must be exposed to join adjacent pipe sections and this requires cutting into the exterior surface of the pipe at the end portion thereof with a utility knife or other tool. The plastic is very hard and difficult to cut, and the process of cutting into the pipe for exposing the wire sometimes results in breakage of the wire.

It would be desirable to have an improved way of visually identifying the location of the wire. It also would be desirable to have an improved way of exposing the wire along the end portion of the pipe once it is located.

SUMMARY OF THE INVENTION

A toneable duct of the type described is made by coextruding the duct, the wire and a longitudinally extending stripe that overlies the wire.

The plastic stripe has a distinct visual appearance compared to the plastic pipe to provide easy visual identification of the wire location. In one arrangement, the stripe is of a different color than the duct.

The stripe plastic material also is softer than the duct plastic material so that it is easier to cut into or cut-away the stripe material for exposing the wire along the exterior surface thereof at an end portion of the duct. In a preferred arrangement, the stripe plastic material is compatible with the duct plastic material so that the two materials crosslink to make the stripe an integral part of the duct. In one arrangement, the duct may be extruded of high density polyethylene while the stripe is extruded of a lower density polyethylene having a different color than the high density polyethylene.

For relatively large duct diameters, the stripe provides a longitudinally extending concave recess in the cylindrical exterior surface of a duct. For relatively small diameter duct, the stripe provides a longitudinally extending convex bulge that extends outwardly of the cylindrical exterior surface of a duct.

It is a principal object of the invention to provide an improved toneable duct.

It is another object of the invention to provide a toneable duct having an improved arrangement for identifying the location of a wire that is embedded in the duct wall.

It is a further object of the invention to provide a toneable duct having an arrangement that makes it easier to expose the wire along the exterior surface thereof at an end portion of the duct.

It is also an object of the invention to provide a toneable duct having a longitudinally extending wire embedded in the wall thereof beneath a stripe of plastic material that is softer than the duct plastic material while being compatible therewith for crosslinking.

DESCRIPTION OF A PREFERRED EMBODIMENT

Figure 1:
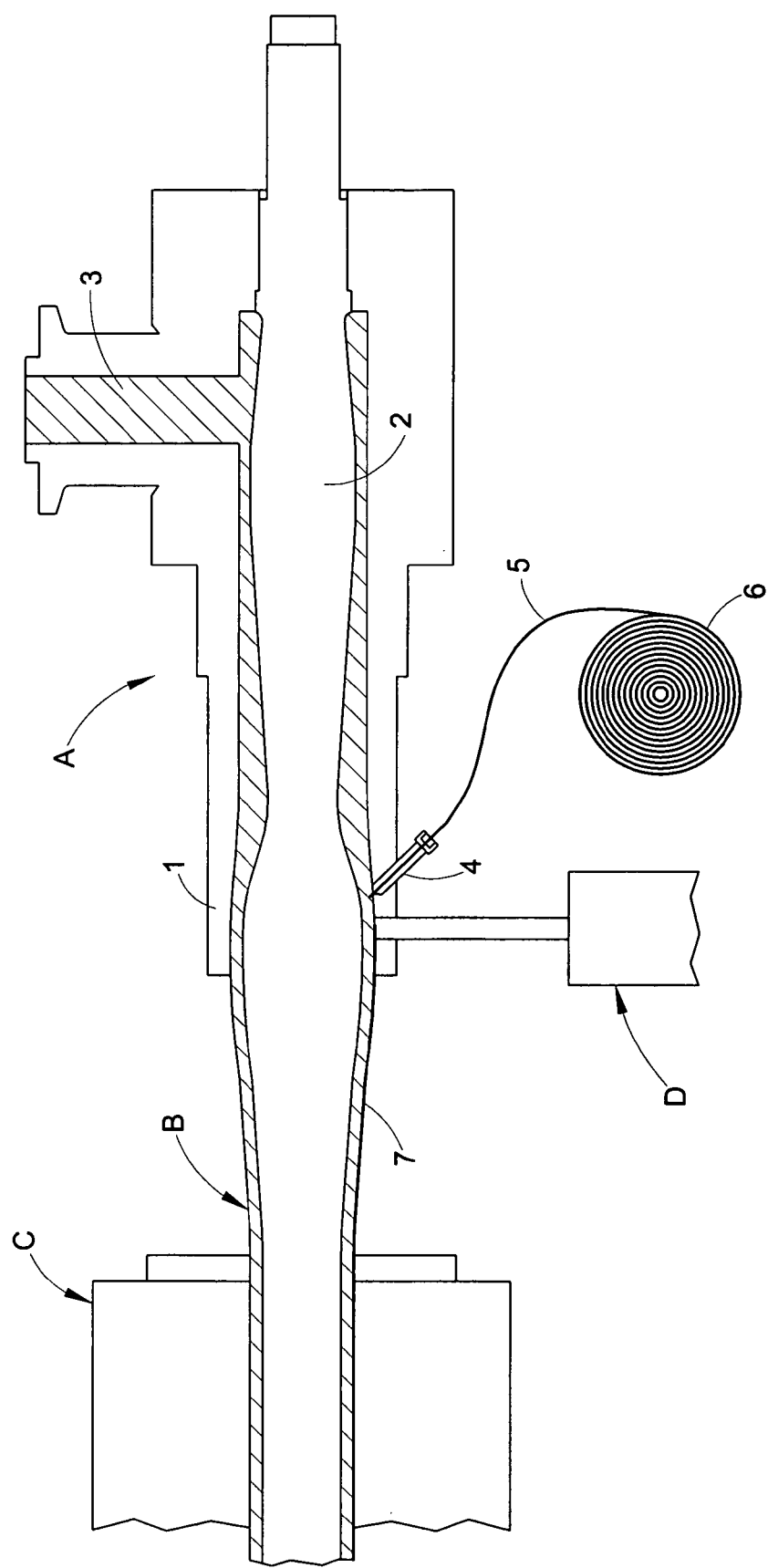
FIG. 1 is partial cross-sectional elevational view showing a typical arrangement for simultaneously extruding a cylindrical duct of plastic material, a wire embedded in the wall of the duct and a stripe of different plastic material overlying the wire.

Referring now to the drawing, wherein the showings are for purposes of illustrating a preferred embodiment of the invention only and not for purposes of limiting same, FIG. 1 shows an extrusion apparatus A having a die 1 and a mandrel 2 that form a generally cylindrical passage for flow of plastic material 3 that exits the die lip as a generally cylindrical duct B and enters a vacuum sizer C.

A hollow screw 4 extends through die 1 into the cylindrical passage between the die 1 and mandrel 2. A copper wire 5 is fed from a coil 6 through screw 6 so that the wire is embedded in the wall of duct B. The degree of penetration of the screw into the cylindrical passage controls the location of the wire within the duct wall.

A coextruder D downstream from screw 4 extrudes a small stripe 7 of different colored plastic material directly over the location of wire 5.

The plastic material used for stripe 7 is different from the plastic material used for duct B. The stripe plastic material has a different visual appearance than the duct plastic material for easily identifying the location of the wire in the duct. By way of example, stripe 7 may be of a different color plastic material than the plastic material used for duct B.

The plastic material used for stripe 7 also is softer than the plastic material used for duct B. This makes it much easier to cut in to or remove the stripe along the exterior surface of the duct at an end portion thereof to expose the wire for connecting same to another wire on an adjacent duct when two ducts are joined together.

The plastic material used for stripe 7 preferably is compatible with or from the same family as the plastic material used for duct B so that the stripe plastic material will crosslink and fuse with the duct plastic material. By way of example, the plastic material used for duct B may be a high density polyethylene while the plastic material used for stripe 7 is a lower density polyethylene.

Figure 2:
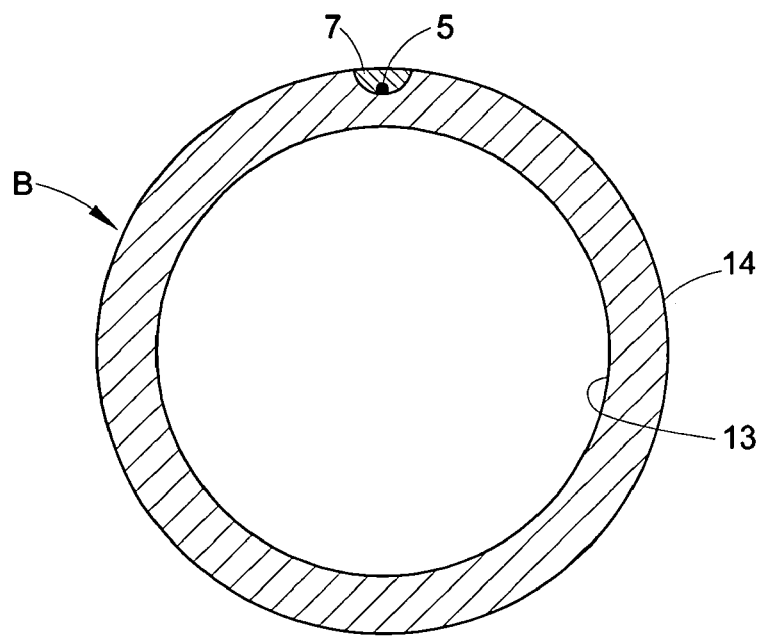
FIG. 2 is a cross-sectional elevational view of duct having a wire embedded in the wall thereof beneath a longitudinal stripe of plastic material.

FIG. 2 shows cylindrical duct B having cylindrical inner and outer surfaces 12, 14. Wire 5 extends longitudinally of duct B parallel to the duct longitudinal axis and is located closer to outer surface 14 than to inner surface 12. Stripe 7 overlies wire 5 to indicate the location of the wire. Wire 5 may be located at the interface between stripe 7 and duct B or may be encapsulated within the plastic material of stripe 7.

By way of example, wire 5 may be 22 gauge copper wire according to the American Wire Gauge size. As an example, a duct having an outside diameter of 1.900 inches has a peripheral wall thickness measured radially of the duct that is 0.173 to 0.194 inch. The stripe of different plastic for such a pipe is around 0.200 inch wide by around 0.050 inch deep.

The thickness of the duct wall should be at least 0.14 inch in order to have sufficient stripe plastic material overlying the wire to avoid having a longitudinally extending bulge on the exterior cylindrical surface of the duct. For smaller duct sizes, such as one inch or smaller outside diameter, the duct wall thickness may be around 0.097 inch or smaller. The stripe of different plastic material then will make a convex outward bulge on the cylindrical exterior surface of the duct that may extend around 0.043 outwardly from the duct exterior surface.

Figure 3:
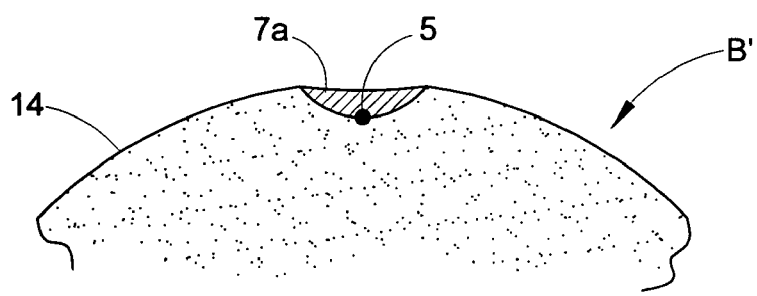
FIG. 3 is a partial cross-sectional elevational view showing a longitudinal concave depression in the plastic stripe at the exterior cylindrical surface of a duct.

FIG. 3 shows a relatively large diameter duct B' having longitudinally extending plastic material stripe 7a overlying wire 5 and forming a longitudinally extending concave depression in the external cylindrical surface of the duct.

Figure 4:
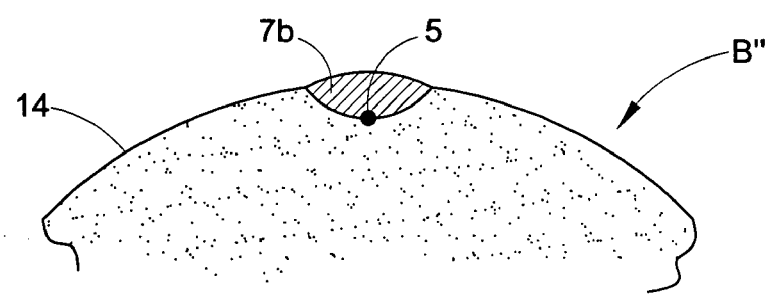
FIG. 4 is a partial cross-sectional elevational view showing a longitudinally extending bulge in the plastic stripe that extends outwardly from the cylindrical outer surface of a duct.

FIG. 4 shows a smaller diameter duct B" having a longitudinally extending stripe 7b of plastic material overlying wire 5 and forming a longitudinally extending convex bulge that extends outwardly from the duct outer cylindrical surface.

For some purposes, it is possible to extrude the wire in a longitudinal recess or channel in the exterior surface of the duct. The stripe of plastic material may then be extruded over the wire to fill the longitudinal recess or channel in the exterior surface of the duct downstream from the duct extrusion die. This may be done while the duct material remains soft or the duct may be reheated along the wire recess so that the stripe plastic will bond to the duct plastic material over the wire.

Although the invention has been shown and described with reference to a representative embodiment, it is obvious that alterations and modifications will occur to others skilled in the art upon the reading and understanding of this application. Therefore, it is to be understood that the invention may be practiced otherwise than as specifically described herein while remaining within the scope of the claims.

What is claimed is:

1. A cylindrical duct having a peripheral wall with generally cylindrical inner and outer surfaces, a wire extending longitudinally of said duct between said inner and outer surfaces, said duct being of polyethylene plastic material having a first density, said wire being covered solely by an external stripe of polyethylene plastic material having a second density that is lower than said first density so that said stripe polyethylene plastic material is softer and easier to cut into than said duct polyethylene plastic material in the hardened solidified state of said duct and stripe plastic materials, said stripe polyethylene plastic material having a stripe outer surface that is exposed on said duct outer surface, said duct and stripe polyethylene plastic materials being of different colors, and said duct and stripe polyethylene plastic materials being compatibly crosslinkable and being crosslinked at an interface therebetween, whereby said stripe plastic material can readily be located and cut into with a sharp cutting tool at an end portion of the duct to expose the wire and strip same away from the duct for connection with a corresponding wire on an adjacent duct.

2. The duct of claim 1 wherein said duct, wire and stripe are simultaneously coextruded so that the duct and stripe polyethylene plastic materials are crosslinked together.

3. A method of providing an external locator stripe for a wire embedded in a peripheral wall of a conduit comprising the steps of simultaneously coextruding a duct of plastic material together with a wire and a stripe of a second plastic material that overlies the wire, the first and second plastic materials being polyethylene of different colors and different densities, with the second plastic material having a lower density than the first plastic material and being softer than the first plastic material in the hardened solidified state of the first and second plastic materials.

* * * * *